United States Patent [19]
Nakamura et al.

[11] 3,870,613
[45] Mar. 11, 1975

[54] PROCESS FOR THE REMOVAL OF MINERAL SALTS FROM MILK

[75] Inventors: Tsutomu Nakamura, Tokyo; Kensuke Itoh, Sayama; Hajime Murata, Kawagoe; Makoto Ishikawa, Hokkaido; Eiichi Furuichi, Kawasaki; Yasuhiro Arakawa, Gunma-ken; Shinichi Taneya, Tachikawa; Hiroji Motomura, Shinnanyo; Katsutoshi Yoshimoto; Hisao Tomokawa, both of Tokuyama, all of Japan

[73] Assignees: Snow Brand Milk Products Co., Ltd., Higashi-ku, Sapporo-shi, Hokkaido; Tokuyama Soda Kabushiki Kaisha, Tokuyama-shi, Yamaguchi-ken, both of, Japan

[22] Filed: Feb. 28, 1974

[21] Appl. No.: 446,730

[30] Foreign Application Priority Data
Mar. 12, 1973  Japan.............................. 48-28060

[52] U.S. Cl............................................. 204/180 P
[51] Int. Cl............................................ B01d 13/02

[58] Field of Search ....................... 204/180 P, 301

[56] References Cited
UNITED STATES PATENTS
3,496,081  2/1970  Scheder.......................... 204/301 X
3,767,548  10/1973  Okada et al. ................... 204/301 X

*Primary Examiner*—John H. Mack
*Assistant Examiner*—A. C. Prescott
*Attorney, Agent, or Firm*—Kane, Dalsimer, Kane, Sullivan and Kurucz

[57] ABSTRACT

Milk or milk products of aqueous liquid form are desalted by ion exchange membrane electrodialysis apparatus which comprises dispersing gas bubbles continuously or intermittently into said milk or milk products in the dilution compartments, simultaneously passing the said milk or milk products through therein at a linear velocity of above 5 cm./sec. and also reversing the polarities of the electrodes intermittently each other so as to effect the above said desalting without any trouble caused by the adherence of proteins and also the deposit of calcium phosphate on the surface of the said membranes.

15 Claims, 3 Drawing Figures

PROCESS FOR THE REMOVAL OF MINERAL SALTS FROM MILK

DETAILED DESCRIPTION OF THE INVENTION

This invention relates to a process for the removal of mineral salts from milk, more particularly it relates to a process for removing mineral salts from milk or its aqueous liquid products by ion exchange membrane electrodialysis apparatus.

It is well known in the art that when cow's milk, goat's milk or other cattle's milks, non-fat milk, whey, butter milk and so on are processed, mineral salts contained therein have to be removed and as a mean for the said desalting ion exchange membrane electodialysis apparatus is applied. The electrodialysis apparatus used for the above said process is composed of plural number of compartments separated by reciprocally arranged anion exchange membranes and cation exchange membranes in which compartments a liquid to be desalted, i.e., milk and the others, to be treated and a liquid for concentrating of ions, i.e., concentrating solution, are alternatively passed through, wherein the compartments in which the former liquid is passed through is named as dilution-compartments and the compartments in which the latter liquid is passed through is named as concentration-compartments, and both outer ends of this stack of cells are arranged with negative and positive electrodes respectively. Only for the simplifying of the disclosure, the materials to be treated, such as cow's milk, goat's milk and the other cattle's milks and their aqueous liquid form products such as non-fat milk, whey, butter milk and so on are named generically as milk in the specification.

When ion-exchange membrane process as mentioned above is employed for the removal of mineral salts from milk, however, since proteins contained in milk adhere on the surface of membranes, the desalting efficiency will decrease and also in some instances the operation will become difficult to continue. Even though the electric current density, liquid to be treated, concentrating solution, electrodes rinse solution, area and number of ion-exchange membranes, dialysis temperature, quality of milk and so on are appropriately regulated, the said adherence of proteins on the membranes will heavily cause not only the decreases of the desalting efficiency but also in some case make impossible for further operation.

When milk is desalted by ion-exchange membrane process, phosphate and calcium ions are released in the side of concentration-compartments and accordingly calcium phosphate is deposited on the membranes which will cause the decreasing of the desalting efficiency and also make difficult further operation. To prevent the deposit of calcium phosphate various means have been proposed, for example, a considerable volume of the solution in concentration-compartments is discarded and fresh NaCl-solution is supplemented therefor at every definite intervals or calcium ion is substituted with sodium ion by passing through the concentrating solution into Na-type cation exchange resin layer. But in the process of the concentrating NaCl solution containing calcium phosphate is discarded and a fresh NaCl solution is supplemented therefor, the volume of the solution to be discarded increases in large quantity and yet proteins adhere on the membranes. In the process of the concentrating solution is passed through into Na-type ion-exchange resin layer, there is required an additional process in which Na-type cation exchange resin is to be used which makes the production cost higher and yet adherence of proteins occur on the resin. Therefore, these both means are difficult to apply for industrial continuous operation.

After our long years studies, we have now established the present invention in which when milk is desalted by ion-exchange membrane process a continuous operation of the desalting of milk can be attained in industrial scale by preventing the adherence of proteins and the deposit of calcium phosphate on the surface of the membranes.

This invention relates to a process for the removal of mineral salt from milk by ion-exchange membrane electrodialysis apparatus which comprises dispersing gas bubbles continuously or intermittently into milk to be treated in the dilution compartments, simultaneously passing the milk to be treated through therein at a linear velocity of above 5 cm./sec. and also reversing the polarities of the electrodes each other intermittently so as to effect electrodialysis said above and the object of the present invention is to provide a process for the removal of mineral salts in good efficiency by ion-exchange membrane process by preventing the adherence of proteins and also the deposit of calcium phosphate on the membranes.

As for the type of the electrodialysis apparatus used for executing the present process in which ion exchange membranes are used, any suitable type thereof may be used and occasionally only cation-exchange membranes may be used as ion-exchange membrane with neutral semipermeable membranes in alternative rearrangement. The concentration-compartments and-/or dilution-compartments may be inserted with spacers to generate turbulance or arranged so as to form a winding stream along the membranes to accelerate the velocity of the flow and simultaneously to prolong the retaining time of the milk to be treated. According to the invention it is preferable to use an ion-exchange membrane electrodialysis vessel of filter-press type, because by the use thereof the distances between membranes may be reduced. As for the examples of desirable apparatus of this type are included, for example, the apparatus described in U.S. Pat. No. 2,708,658, Japanese Patent Publication No. Sho 32-8165, etc., however, it is not limited only in these types but also the other type of electrodialysis vessel such as in a form of water tank may be used.

According to the invention, however, even though any type of ion-exchange membrane electrodialysis apparatus may be used, it is necessary to use an equipment which is capable to disperse gas bubbles into milk to be treated in the dilution-compartments and also to reverse the polarities of the electrodes each other.

An embodiment of the ion-exchange membrane electrodialysis apparatus used for the execution of the present process is illustrated by the FIGS. 1 – 3, as follows:

FIG. 1 diagrammatically illustrates in section an apparatus including an electrode (− pole) 1, an electrode (+ pole) 2, anion-exchange membranes 3, cation-exchange membranes 4 and fastening plates 5 which are used to compress the assembly between both ends after having equipped the apparatus. The electrode rinse solution is circulated between the fastening plate 5 and the terminal ion-exchange membrane and the inlet and outlet of the circulation are shown as 6 and 7 respectively in the FIG. 1. The milk to be treated is introduced in the apparatus through entrance 8 and after the desalting thereof by circulating in the pathway of the apparatus it is discharged from the outlet 9 as treated milk. The concentrating solution is introduced into the apparatus through the inlet 10 and after circulating by passing through the pathway in the apparatus flow out from the outlet 11 and again introduced from the inlet 10 for further recirculation. Gas bubbles-supplying tubes 12 and 13 are arranged in every compartment in the apparatus, through which gas bubbles are brown into milk and concentrating solution. 14 is a commutator for the reverse of the electrodes polarities.

FIG. 2 illustrates the pathways of the milk and electrodes rinse solution in the apparatus shown in FIG. 1 more plainly. The milk to be treated is introduced in the apparatus through the entrance 8, passed through each dilution-compartments formed between anionic membrane 3 and cationic membrane 4 to effect desalting and then discharged through the outlet 9. The pathway of milk is inserted with the perforated gas bubbles supplying tube 12, through which gas bubbles are dispersed in the solution to cause agitation of the solution and also simultaneously vibration of the membranes.

FIG. 3 illustrates the pathways of the concentrating solution and positive electrode rinse solution more plainly. The concentrating solution is introduced through the inlet 10 of the concentrating solution, passed through each concentration compartments and then run out through the outlet 11 and after circulation again introduced through inlet 10. Gas bubbles supplying tubes 13 are also shown in FIG. 3.

Milk to be desalted according to the process of the invention includes, for example milk such as cow's milk, goat's milk and other cattle's milk and also their aqueous liquid products such as non-fat milk, whey, butter milk and so on.

According to the invention milk to be treated as said above is passed through the above said dilution-compartments of ion-exchange membranes electrodialysis apparatus, while in the concentration compartments in general a solution of an electrolyte which is hard to form precipitated phosphate salts, for example 0.01 – 1 percent, preferably 0.1 percent NaCl-solution is passed through therein. In the electrode rinse compartments, a solution of an electrolyte such as 0.5 – 5 percent NaCl-solution, preferably 1 percent-NaCl solution is circulated.

In the treatment of milk, since protein is apt to adhere on the surface of the membranes, for preventing this increasing of the linear velocity of the flow of the milk to be treated is required. According to the invention the solution is agitated and prevented from the adherence of proteins on the surface of the membranes as well as the deposit of mineral salts on the surface of the membranes by adjusting the linear velocity in the dilution compartments at above 5 cm./sec. and below 30 cm./sec., preferably 8 – 12 cm./sec. and dispersing gas bubbles by blowing a gas not injurious for milk, for example air, nitrogen, etc., continuously or intermittently. When the linear velocity said above is exceeded above 30 cm./sec., there will be led to the adherence of proteins and also the dropping of the electric current density which will cause the lowering of efficiency. Also in the concentration compartments it is preferable to adjust the linear velocity as said above and/or to supply gas bubbles as said above.

As for the means for blowing bubbles, there is no particular limitation and it may be suitably adopted with such means, for example blowing bubbles directly into each compartments or supplying bubbles in each compartment by blowing gas through nozzles positioned between each compartment and milk (and also concentrating solution) supplying pump. Though the optional volume of the gas to be blown therein is suitably altered according to the type of the apparatus, flow rate and viscosity of the liquid to be treated, it is sufficient if gas is dispersed in the liquid in finely dispersed conditions and this can be easily determined by the preliminary test. For example, if whey is to be used, the volume of gas to be blown therein is in a range of from one-half to one-twentieth volume, preferably from one-fifth to one-tenth volume based on the volume of whey.

According to the invention the adherent proteins on the membranes may be released by reversing the polarities of the electrodes for a short time. It is effective to reverse the polarities intermittently for a short time such as from 30 seconds to 3 minutes once in every period of from 30 minutes to 2 hours.

After the completion of the desalting operation the interior of the apparatus is rinsed with alkali as well as acid solution according to the sort and quality of the milk used.

According to the invention, as stated above, the adherence of proteins and the deposit of calcium phosphate on the surface of the membranes can be prevented by simultaneously increasing the flow rate of the milk, blowing gas into the milk to be treated and also reversing the polarities intermittently, however, when only one of means said above is applied the above said preventing effects can not be attained and also the above said continuous operation of the process is impossible. This is, only if these three means said above are combined, the adherence of proteins and calcium phosphate can be prevented and thereby the continuous desalting treatment in the use of ion-exchange membranes can be attained quite effectively.

Upon treating milk according to the invention the whole amount of the milk may be desalted, however, in some cases it is also possible to obtain a milk desalted in the desired degree of demineralization by desalting a part of the whole amount of milk to be treated in a higher degree and then mixing with the remaining untreated milk therewith. It is also possible to obtain a milk desalted in a certain degree by circulating the milk to be treated at first in the apparatus and after reached at a certain degree of demineralization charging untreated milk into the circulating milk and simultaneously discharging the milk desalted in a desired degree in the same volume as being supplied.

The present invention will be further illustrated by the following examples.

EXAMPLE 1

An ion-exchange electrodialysis apparatus in which anion exchange membranes and cation exchange membranes each having effective area of 30 dm.$^2$ per one sheet are arranged alternatively in 2 mm. distance to form 101 concentration compartments and 100 dilution-compartments and which is operated at voltage of 220 V and electric current of 10 – 20 A and in which both electrode chambers are circulated with 0.2 tons of 1 percent NaCl-solution as electrode rinse solution and 0.1 percent of NaCl-solution is circulated in linear velocity of 10 cm./sec. as concentrating solution in the concentration-compartments is used. Non-fat milk is circulated in the said apparatus and simultaneously one-tenth volume of air based on the volume of non-fat milk treated is supplied therein through the gas inlet tubes and the polarities of the electrodes are reversed each other for one minute once every 30 minutes and thus electrodialysis is continued for 5 hours and a non-fat milk desalted in the degree of 25 percent is obtained. The dilution compartments is then washed with water for 10 minutes, during which air blow is continued in the dilution compartments.

The above mentioned one run of operation was further repeated continuously for 30 runs, however, any deficiency in the demineralization was not recognized throughout the operation. Also at this point the apparatus was overhauled but any abnormality was found therein and also any deposition was not observed on the membranes.

EXAMPLE 2

The ion-exchange electrodialysis apparatus same as used in Example 1 is used and is operated at the voltage of 220 V and electric current of 10 – 60 A under circulating each 0.2 tons of 1 percent NaCl-solution as electrode rinse solution and also circulating 0.1 percent NaCl-solution as concentrating solution in linear velocity of 10 cm./sec. Simultaneously concentrated whey is charged into the dilution-compartments in a linear velocity of 10 cm./sec. and one-fifth volumes of air based on the volume of said whey is supplied for 1 minute once every 50 minutes and the polarities are reversed each other for 1 minute once every 30 minutes during the operation and thus after 5 hours' electrodialysis a concentrated whey desalted in the degree of 90 percent, is obtained. After the completion of the demineralization the dilution-compartments are rinsed by circulating with 0.2 tons of 0.2 percent NaOH-solution for 10 minutes and then water for 5 minutes under supplying of air. After then the dilution-compartments and concentration-compartments are rinsed by circulating with each 0.2 tons of 0.2 percent HCl-solution for 10 minutes and then water for 10 minutes.

The above mentioned one run of operation was further repeated continuously for 30 runs, however, any deficiency in the demineralization was not observed to prove the possibility of the continuous operation. Also at this point the apparatus was overhauled but any abnormality was found therein and also any deposition was not observed on the surface of the membranes.

Contrary to the above mentioned results, when the said operation was carried out at 3 cm./sec. of the linear velocity of the concentrating solution and concentrated whey without supplying of air and also without the reverse of polarities, proteins, etc., were deposited on the membranes and after 2 hours' operation the overall performance of the apparatus was interrupted and when the linear velocity was increased to the above mentioned condition the operation of up to five runs were possible, however, at sixth run the operation was interrupted. When the linear velocity was further increased and only air was supplied the operation was possible until 15 runs but further operations were impossible because of the increasing of deposit on the membranes and lowering of the efficiency of the demineralization. The same results were obtained when the linear velocity was increased to 10 cm./sec. and only the reverse of the polarities was employed without supplying of air.

Figure 1:
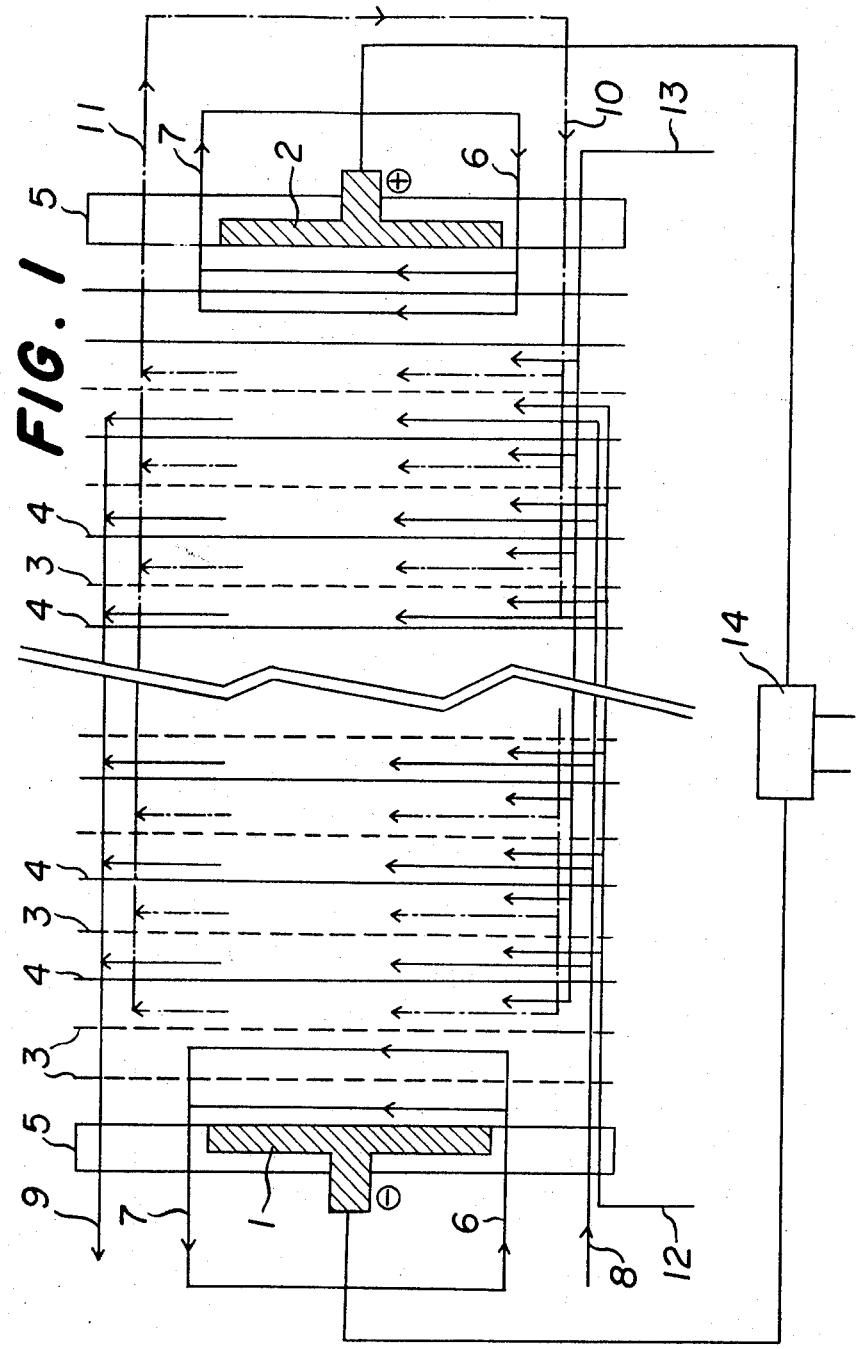
FIG. 1 diagrammatically illustrates in section of an embodiment of the ion-exchange membrane electrodialysis apparatus used for executing the present process.
Figure 2:
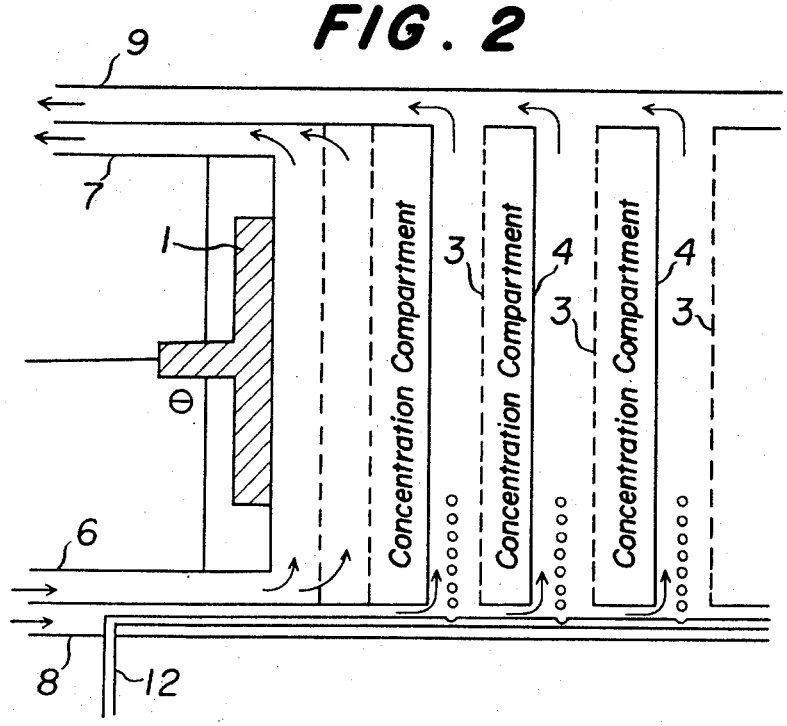
FIG. 2 is illustration representing diagrammatically the flow circuits of milk and also anode (−) solution in the apparatus shown in FIG. 1.
Figure 3:
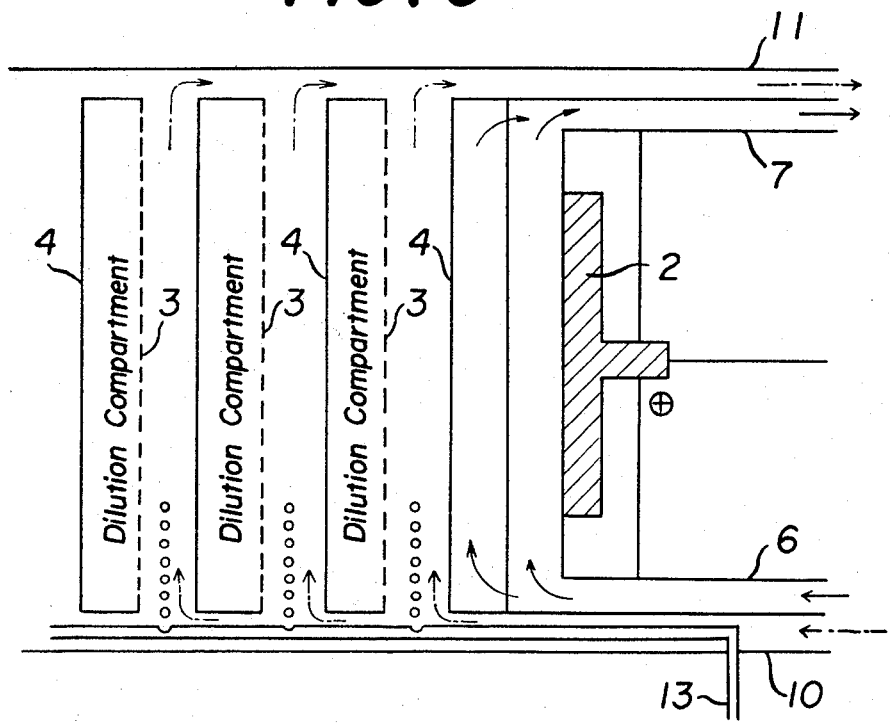
FIG. 3 is illustration representing the circuits of the concentrating solution and cathode (+) solution in the apparatus shown in FIG. 1.

The numeral in theses Figures represents as mentioned under:

| | |
|---|---|
| 1 | Electrode (anode) |
| 2 | Electrode (cathode) |
| 3 | anion-exchange membrane |
| 4 | cation-exchange membrane |
| 5 | fastening plates |
| 6 | inlet of circuit of the electrode rinse solution |
| 7 | outlet of the circuit of the electrode rinse solution |
| 8 | entrance of the milk to be treated |
| 9 | outlet of the milk to be treated |
| 10 | inlet of the concentrating solution |
| 11 | outlet of the concentrating solution |
| 12 | gas supplying tube |
| 13 | gas supplying tube |
| 14 | Comutator of polarity |

What is claimed is:

1. A process for the removal of mineral salts from milk or milk products of aqueous liquid by ion exchange membrane electrodialysis apparatus having dilution compartments and concentration compartments which comprises dispersing gas bubbles continuously or intermittently into the above said milk or its products in the dilution-compartments, while simultaneously passing the above said milk or its products through said dilution compartments at a linear velocity of above 5 cm./sec. and reversing the polarities of the electrodes intermittently.

2. The process according to claim 1, wherein and milk is cow's milk, goat's milk, or other cattle's milk.

3. The process according to claim 1, wherein said milk product of aqueous liquid form is non-fat milk, whey, or butter milk.

4. The process according to claim 1, wherein said gas is nitrogen or air.

5. The process according to claim 1, wherein the volume of the gas to be blown is one-half to one-twentieth volume based on the volume of milk or its products to be treated.

6. The process according to claim 1, wherein the volume of the gas to be blown is one-fifth to one-tenth volume based on the volume of milk or its products to be treated.

7. The process according to claim 1, wherein said linear velocity of milk is in a range of 5 – 30 cm./sec.

8. The process according to claim 1, wherein the polarities of the electrodes are reversed for a period of from 30 seconds to 3 minutes once every interval of from 30 minutes to 3 hours during the operation.

9. The process according to claim 1, wherein, as ion exchange membranes, cation and anion exchange membranes are used in alternative arrangement.

10. The process according to claim 1, wherein, as ion-exchange membranes, cation-exchange membranes are used together with neutral semipermeable membranes in alternative arrangement.

11. The process according to claim 1, wherein spacers are inserted in dilution compartments and/or concentration compartments.

12. The process according to claim 1, wherein as concentrating solution 0.01 – 1 percent NaCl-solution is used.

13. The process according to claim 1, wherein, as electrode rinse, a solution of 0.5 – 5 percent NaCl-solution is used.

14. The process according to claim 1, wherein at first a certain volume of milk or its aqueous liquid product to be treated is circulated in the said apparatus and after reaching the desired degree of demineralization continuous charging of the said milk or its product to be treated is newly started while the circulating milk or its product demineralized at a desired degree is continuously discharged in the same volume as being charged.

15. The process of claim 1, further comprising mixing the demineralized milk or milk product obtained with untreated milk or milk-product.

* * * * *

UNITED STATES PATENT OFFICE
CERTIFICATE OF CORRECTION

PATENT NO. : 3,870,613
DATED : March 11, 1975
INVENTOR(S) : Tsutomu Nakamura et al It is certified that error appears in the above-identified patent and that said Letters Patent are hereby corrected as shown below:

At Column 6, Claim 2, line 1, - "and" should be -- said --

Signed and sealed this 10th day of June 1975.

(SEAL)
Attest:

RUTH C. MASON
Attesting Officer

C. MARSHALL DANN
Commissioner of Patents
and Trademarks